3,076,836
PROCESS FOR THE PREPARATION OF TETRA-
CYANOETHYLENE BY PYROLYSIS OF DIBRO-
MOMALONONITRILE
Elmore L. Martin, Wilmington, Del., assignor to E. I.
du Pont de Nemours and Company, Wilmington, Del.,
a corporation of Delaware
No Drawing. Filed Sept. 20, 1960, Ser. No. 57,156
4 Claims. (Cl. 260—465.8)

This invention is concerned with a new process for preparing tetracyanoethylene.

Tetracyanoethylene has been prepared by the reaction of malononitrile with sulfur monochloride. It has also been prepared by the vapor-phase reaction of malononitrile with a halogen (Heckert, U.S. 2,794,823). In this reaction, yields of tetracyanoethylene in excess of about 40% (based on malononitrile) have not been obtained, presumably because of the deleterious effect of the by-product hydrogen halide which is always present among the products of the process. Somewhat higher yields of tetracyanoethylene have been obtained by reacting a dihalomalononitrile (or alkali metal halide complex thereof) with a metal or a metal cyanide (Heckert and Little, U.S. 2,794,824). This latter process requires at least an equivalent amount, and preferably a molecular excess, of the metal or metal cyanide reactant, and at temperatures in excess of 150° C. there is loss of product through formation of carbonaceous residues.

There has now been discovered a process for the preparation of tetracyanoethylene by the vapor-phase pyrolysis of dibromomalononitrile at temperatures in excess of 250° C. The products of the pyrolysis are tetracyanoethylene and bromine, and in the preferred temperature range of 275–400° C. the yields are substantially quantitative. Temperatures above 500° C. are to be avoided because of degradation of tetracyanoethylene in the presence of bromine at these temperatures.

The reaction may be carried out batchwise or on a continuous basis, and no catalyst is required. The material of the reactor in which the pyrolysis takes place is not critical as long as it is substantially inert to dibromomalononitrile, tetracyanoethylene, and bromine at the temperatures employed. In the examples, a reactor of borosilicate glass is employed. A fused silica reactor is equally serviceable. Ceramic materials and inert metals and alloys may also be employed.

The shape of the reactor is not critical. It is convenient to use a tubular reactor as in the examples. The reaction may be carried out equally well by dropping dibromomalononitrile continuously into a heated pot, the surface of the pot serving to vaporize the dibromomalononitrile and bring the vapors within the temperature range indicated above for the pyrolysis to take place. The off-vapors are led to cooling and condensing chambers where tetracyanoethylene and bromine may be collected separately.

The process of this invention may be carried out in the presence of a diluent or carrier material inert to the reactants and resulting products, but as illustrated in Examples V and XII–XIX below, no diluent is required.

When the reaction is operated in a continuous manner, the use of a diluent may be advantageous in moving the vapors through the heated zone of the reactor. In addition to methylene chloride and carbon tetrachloride illustrated in the examples, similar diluents, as well as nitrogen, helium, argon, and the like, may be employed.

The tetracyanoethylene and bromine produced in the process of this invention are readily separated. For example, the total off-vapors may be condensed by cooling to room temperature or below, and the solid tetracyanoethylene separated from the bromine (and any liquid carrier) by filtration. Alternatively, the off-vapors may be first cooled to a temperature between the boiling point of bromine and the melting point of tetracyanoethylene (preferably in the range between 75 and 150° C.), whereupon the tetracyanoethylene separates as a solid. The remaining vapors are then cooled to room temperature or below to recover the bromine.

The pyrolysis of this invention has the advantage of being unexpectedly free of side reactions which would decrease the yield and contaminate the products. Under preferred conditions, tetracyanoethylene and bromine are obtained in quantitative yields. Fractional condensation of the off-vapors provides these two products, each in a high state of purity. For example, the bromine can be used directly for the bromination of malononitrile to provide dibromomalononitrile for recycling in the process of this invention. Tetracyanoethylene is useful for preparing tricyanovinylamine dyes, as shown by McKusick et al., J. Am. Chem. Soc. 80, 2806 (1958).

Pressure is not a critical factor in the pyrolysis of this invention. As long as the temperature and vapor phase requirements are met, pressure both below and above atmospheric pressure may be employed, atmospheric pressure being preferred as a matter of convenience.

The formation of tetracyanoethylene and bromine from dibromomalononitrile takes place almost instantaneously on bringing the dibromomalononitrile vapor to the desired reaction temperature (i.e., in excess of 250° C.) There is no advantage in holding the pyrolysis products at the reaction temperature, and, once that temperature has ben reached, the vapors may be cooled substantially at once, for example, after one second. However, in operating with substantial amounts of dibromomalononitrile and in equipment of practical size, provisions should be made for variations in flow and heat transfer. An average minimum of at least five seconds at the reaction temperature is preferred. Thus, in continuous operation in a tubular reactor as in the examples, space velocities in the range of 1–500 are preferred, space velocities higher than 500 permitting heating times so short that some of the dibromomalononitrile may pass through unchanged. If space velocities in the range of 500–1000 are employed, high yields may still be obtained by separating and recycling any unchanged dibromomalononitrile. Space velocity is the volume of reactants per volume of the reactor per hour at 0° C. and 760 mm. pressure. The value given refers to the total charge passing through the tube.

In the following examples parts are by weight unless otherwise indicated. Example V illustrates a preferred embodiment of this invention.

EXAMPLE I

*Reactor.*—A borosilicate glass tube with a diameter to length ratio of approximately 1:20 is provided with external electrical heating means along two thirds of its lengths and is fitted with a borosilicate glass thermocouple well running the length of the center of the tube and having an outside diameter approximately one fourth the inside diameter of the tube. Starting from the inlet end of the tube, the first two thirds of the heated zone is packed with hollow borosilicate glass cylinders having a length and an outside diameter each about one fourth the diameter of the tube. This packing serves as heat exchange material to bring the reactants to the reaction temperature. The next one third of the heated zone is packed with borosilicate glass cylinders as in the first part of the heated zone or with other packing materials as indicated below. Reaction temperatures are observed by a thermocouple inserted in the thermocouple well. The tube is mounted vertically and fitted with inlet means at the top and outlet, cooling and collecting means at the bottom.

*Procedure.*—A solution of 120 parts of dibromomalononitrile and 266 parts of methylene chloride is introduced slowly and continuously through the inlet of the reaction tube described above during the course of 78 minutes. The lower one third of the heated zone of the tube is packed with a commercial grade of activated carbon impregnated with cupric chloride and the temperature of the tube is maintained at 325° C. Under these conditions, the reactants vaporize completely on contact with the packing material, the vapor mixture passing through the reaction zone at a space velocity of 96. The effluent vapors are cooled to room temperature and the liquid that condenses is collected in a glass receiver. At the end of the run, any reactants and products remaining in the heated zone are swept through with nitrogen. The tetracyanoethylene collects as a colorless solid just below the heated zone of the reaction tube and the bromine and methylene chloride collect in the cooled glass receiver.

Essentially pure tetracyanoethylene (26 parts) is removed by scraping the reactor. (Such deposition can be prevented by maintaining the tube walls above the sublimation temperature.) The tetracyanoethylene scraped from the tube melts at 197–199° C. in a sealed tube. The tetracyanoethylene is further identified (a) by its ultraviolet spectrum, (b) by colored Pi complexes with benzene (yellow), xylene (red) hexamethylbenzene (violet), anisole (burgundy), and anthracene (transient green), and (c) by its reaction with N,N-dimethylaniline, first to form the blue charge-transfer compound, the color changing within a few seconds to magenta with the formation of 4-tricyanovinyl-N,N-dimethylaniline.

EXAMPLE II

A solution of 224 parts of dibromomalononitrile and 447 parts of carbon tetrachloride is introduced into the reactor described in Example I at a space velocity of 202 and a temperature of 325° C. The yield of tetracyanoethylene crystallized from methylene chloride is 60 parts (95%).

EXAMPLE III

A solution of 224 parts of dibromomalononitrile and 447 parts of carbon tetrachloride is introduced into the reactor described in Example I at a space velocity of 101 and a temperature of 325° C. In this run, activated charcoal alone is used to pack the lower one third of the heated zone. The yield of colorless tetracyanoethylene, after crystallization from methylene chloride, is 61 parts (95%).

EXAMPLE IV

A solution of 224 parts of dibromomalononitrile and 447 parts of carbon tetrachloride is introduced into the reactor described in Example I at a space velocity of 106 and a temperature of 325° C. In this run the reactor is packed with hollow glass cylinders only. The yield of tetracyanoethylene scraped from the reactor is 64 parts (100%).

EXAMPLE V

The procedure of Example IV is repeated with the exception that the carbon tetrachloride is omitted. Under these conditions, the space velocity is 48. The yield of essentially pure tetracyanoethylene obtained by scraping the reactor is 64 parts (100%).

Table I summarizes other examples of this invention using the procedure of Example I in which different reaction conditions are used to prepare tetracyanoethylene.

*Table I*

| Example | Dibromo-malono-nitrile, Parts | Diluent | | Packing [1] | Temp., °C. | Time, Min. | Space Velocity | Tetracyanoethylene | |
|---|---|---|---|---|---|---|---|---|---|
| | | Compound | Parts | | | | | Parts | Percent Yield |
| VI | 224 | $CH_2Cl_2$ | 450 | Glass+$CuCl_2$ on C. | 325 | 135 | 97 | 56 | 87 |
| VII | 224 | $CCl_4$ | 447 | do | 325 | 82 | 101 | 63 | 99 |
| VIII | 224 | $CCl_4$ | 447 | do | 325 | 41 | 202 | 60.5 | 95 |
| IX | 224 | $CCl_4$ | 447 | do | 325 | 82 | 101 | 61 | 96 |
| X | 224 | $CCl_4$ | 447 | Glass+C | 325 | 82 | 101 | 60 | 94 |
| XI | 224 | $CCl_4$ | 447 | do | 325 | 63 | 101 | 63 | 98 |
| XII | 224 | | | Glass | 350 | 33 | 48 | 64 | 100 |
| XIII | 224 | | | do | 350 | 28 | 58 | 64 | 100 |
| XIV | 224 | | | do | 350 | 22 | 72 | 64 | 100 |
| XV | 224 | | | do | 225 | 33 | 48 | 1.5 | 2.3 |
| XVI | 224 | | | do | 250 | 33 | 48 | 14 | 22 |
| XVII | 224 | | | do | 275 | 22 | 48 | 46 | 72 |
| XVIII | 224 | | | do | 300 | 33 | 48 | 57 | 89 |
| XIX | 224 | | | do | 325 | 33 | 48 | 64 | 100 |

[1] Glass=hollow borosilicate glass cylinders; C=activated charcoal.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for the formation of tetracyanoethylene which consists essentially of pyrolyzing dibromomalononitrile at a temperature in the range of 250–500° C. and isolating the resulting tetracyanoethylene.

2. Process according to claim 1 wherein said temperature range is 275–400° C.

3. Process according to claim 1 wherein said pyrolysis is in the presence of a diluent inert to the reactants and resulting products.

4. Process for the formation of tetracyanoethylene in a continuous operation which consists essentially of passing dibromomalononitrile through a reaction zone at a temperature in the range of 250–500° C. and at a space velocity of 1–1000.

References Cited in the file of this patent

UNITED STATES PATENTS 2,794,823    Heckert     June 4, 1957
2,794,824    Heckert et al.     June 4, 1957

OTHER REFERENCES

Beilstein: Volume 2, page 596 (1920). (Copy in Scientific Library.)